June 4, 1946.　　　　S. F. COX　　　　2,401,552
WINDOW CONSTRUCTION
Filed June 2, 1943
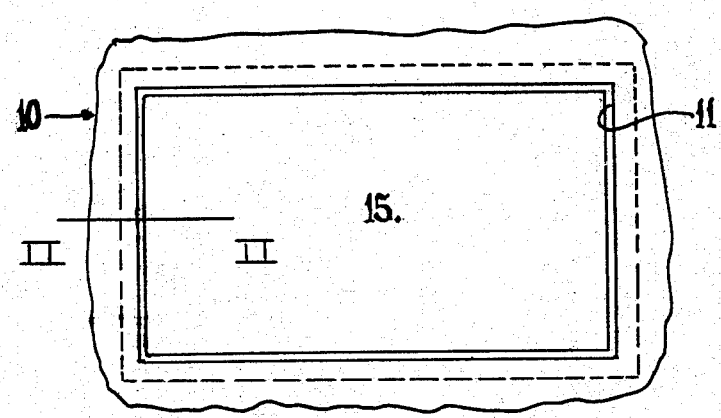
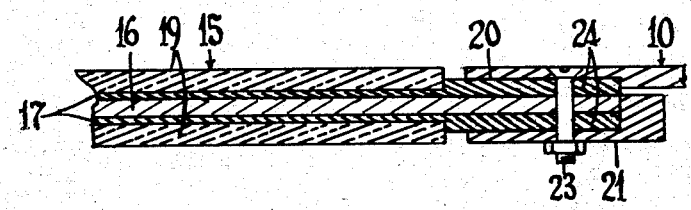
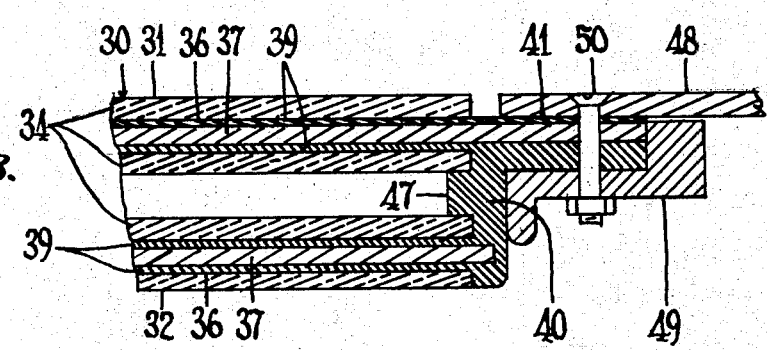
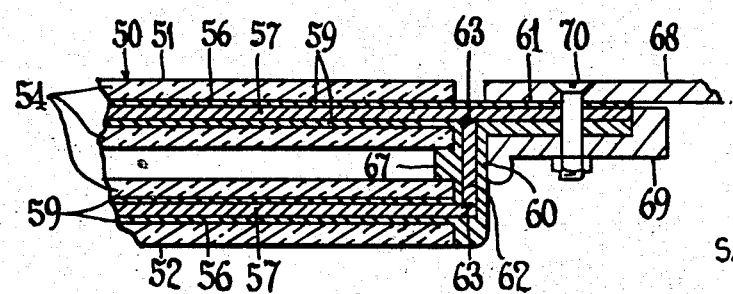
Inventor
SAMUEL F. COX
By Olen E. Bee
Attorney Patented June 4, 1946

UNITED STATES PATENT OFFICE 2,401,552

WINDOW CONSTRUCTION

Samuel F. Cox, Pittsburgh, Pa., assignor to Pittsburgh Plate Glass Company, Allegheny County, Pa., a corporation of Pennsylvania Application June 2, 1943, Serial No. 489,364

2 Claims. (Cl. 20—56.5)

This invention relates to transparent closure structures and it has particular relation to such structures in which laminated glass units are flexibly mounted in wall sections without clamping the glass portions of the units.

One object of the invention is to provide an improved combination of laminated interlayer structure, together with glass plates in which the interlayer is particularly designed to be extended beyond the glass edges to serve as a flexible mounting element.

Another object of the invention is to provide an improved flexible and tough interlayer of laminated plastic that is adapted to extend as a mounting flange beyond the edges of the glass plates laminated on opposite sides thereof.

Another object of the invention is to provide an improved multiple glazed unit in which laminated plastic interlayers are joined to provide deformable connection between panels of the unit.

In the drawing:

Fig. 1 is a fragmentary side elevation of a wall section including a laminated closure structure;
Fig. 2 is a fragmentary cross section, on a larger scale, taken substantially along the line II—II of Fig. 1; Fig. 3 is a cross section similar to Fig. 2 of a double glazed unit mounted in a supporting frame; and Fig. 4 is a cross section similar to Fig. 3 of another form of double glazed unit.

In practicing the invention a wall section 10 which can be a part of an airplane compartment, vehicle, or other structure is provided with an opening 11 in which a closure unit 15 of transparent laminated form is disposed. In one form of laminated unit, a sheet of thermo-plastic material 16 harder than the substance ordinarily employed as interlayer material in laminated units is provided with softer plastic layers 17 bonded on opposite sides thereof. The central sheet 16 can be in the form of methyl methacrylate resin, an example of which is known under the trade name of "Lucite." The softer plastic layers 17 can be in the form of organic resin compound, such as plasticized vinyl acetal resin or other resin adapted to be employed in laminating glass. The laminated plastic interlayer thus formed is carried between glass plates 19 which are bonded upon opposite sides thereof; that is, directly to the outer surfaces of the plastic layers 17.

The marginal portions of the laminated interlayer extends beyond the edges of the glass plates and constitute a flexible and resilient mounting flange 20 extending continuously around the unit and clamped in fluid-tight relation between the wall section 10 and clamping members 21 which are drawn tightly toward each other by means of suitable fastening elements 23, such as bolts.

The portion of the laminated interlayer extending beyond the glass edges is thicker, as indicated at 24, than that which lies between the glass plates. This increased overall thickness is achieved by thickening the softer resin layers 17. The harder central sheet of plastic 16 thus serves to impart sufficient strength and toughness to the mounting flange to withstand strains to which the laminated unit may be subjected while at the same time permitting such flexibility and resiliency as to compensate for distortion of supporting frame and clamping members as well as to relieve glass of any direct clamping forces that would otherwise seriously affect the glass portion of the unit. The outer layers of softer resin provide for efficient fluid-tight joints because of its relatively soft and deformable character. The combined resin layers 16 and 17 are thus well adapted to support the unit flexibly in fluid-tight relation when clamped as described.

Another form of structure shown in Fig. 3 comprises a double glazed unit 30 in which two laminated spaced panels 31 and 32 are included. Each panel comprises glass plates 34 bonded upon opposite sides of a laminated plastic interlayer 36 in the form of a central harder plastic sheet 37 having softer organic plastic layers 39 bonded upon opposite sides thereof. The glass plates in turn are bonded upon the outer sides of the layers 39. The tougher and stiffer sheets 37 are composed of methyl methacrylate resin, such as the resin 16 shown in Fig. 2, and the softer organic plastic layers 39 can be in the form of vinyl acetal resin corresponding to that described with reference to the layers 17 in the latter figure. Although the central sheets 37 are harder and stiffer than plastic ordinarily used in laminating glass, they have considerable resiliency.

The vinyl acetal resin is extended to form a bridge 40 between the spaced marginal portions of the adjacent laminated panels 31 and 32 and is continuous from one panel to the other. In the outer panel 31, the laminated interlayer 36 extends beyond the edges of the glass plates to form a flexible resilient mounting flange 41. Along at least one side of the flange the softer plastic is thicker than that lying between the glass plates. The softer resin extending beyond the edges of the plates and bridging the space between the panels envelopes the edges of the glass and interlayer element 37 of the inner panel 32. A portion of this plastic overlaps the opposed marginal edges of the panels, as indicated at 47, to serve as a spacer and facilitate the preliminary assembly of the glass and plastic. The walled section 48 and clamping elements 49 with the aid of the bolts 50 engage the flange 41 and clamp it in fluid-tight relation in the same manner as that described with reference to Fig. 2. It will be noted that the single flange 41 constitutes the sole connection between the double glazed unit and the surrounding supporting frame.

Fig. 4 illustrates a structure which comprises a double glazed unit 50 and in which two laminated spaced panels 51 and 52 are included. Each panel comprises glass plates 54 bonded upon opposite sides of a laminated plastic interlayer 56 in the form of a central harder and resilient plastic sheet 57 having softer plastic layers of organic plastic 59 bonded upon opposite sides thereof. The glass plates in turn are bonded upon the outer sides of the layers 59. The tougher and stiffer sheets 57 are composed of methyl methacrylate resin, such as the resin 16 shown in Fig. 2, and the softer organic plastic layers 59 can be in the form of vinyl acetal resin, or the like, corresponding to that described with reference to the layers 17 in Fig. 2.

Both the softer and stiffer resins are extended to form a bridge 60 between the spaced marginal portions of the adjacent laminated panels 51 and 52 and is continuous from one panel to the other. In the outer panel 51 of the laminated unit 50 the plastic interlayer 56 extends beyond the edges of the glass plates to form a flexible, resilient mounting flange 61. Along at least one side of the flange, the softer plastic is thicker than that lying between the glass plates. The softer resin that extends beyond the edges of the glass plates to bridge the space between the panels envelopes the edges of the glass and interlayer element 57 of the inner panel 32. The stiffer elements 57 are joined by a transverse bridging section 62 of the same material which has its opposite edges fused, as indicated at 63, to these sheets to form an integral structure. A portion of this plastic overlaps the opposed marginal portions of the panels, as indicated at 67, to serve as a spacer and to facilitate the mounting of the plastic and glass in the preliminary stages of assembly. The wall section 68 and clamping elements 69 with the aid of the bolts 70 engage the flange 61 and clamp it in fluid-tight relation in the same manner as that described with reference to Fig. 2. It will be noted that the flange 61 constitutes the sole connection between the double glazed unit and the surrounding supporting frame.

Although illustrative forms of the invention have been shown and described in detail, it will be apparent to those skilled in the art that the invention is not so limited, but that various changes can be made therein without departing from the spirit of the invention or from the scope of the appended claims.

I claim:

1. In a closure structure, a double glazed unit comprising two laminated panels disposed in parallel, spaced relation one overlying the other, each panel including outer plates of glass and a central sheet of tough, resilient plastic; layers of softer deformable organic plastic bonded upon opposite sides of each central sheet to form therewith a laminated interlayer, the combined sheet and layers of plastic extending from one panel as a laminated mounting flange beyond the edges of the glass entirely around the perimeter thereof, and a plastic bridge integrally connecting the interlayers of the two panels to close the space between the marginal portions of said panels, said bridge including a section of tough, resilient plastic sheet integrally connected to the tough resilient sheet of each panel and covered throughout its extent with the softer, deformable plastic.

2. In a closure structure, a double glazed unit comprising two laminated panels disposed in parallel spaced relation one overlying the other, each panel including outer plates of glass and a central sheet of tough, resilient plastic; layers of softer, deformable organic plastic bonded substantially coextensively upon opposite sides of each central sheet to form therewith a laminated interlayer, the combined sheet and layers of plastic of one panel extending from the latter as a laminated mounting flange beyond the edges of the glass entirely around the perimeter thereof, and a plastic bridge integrally connecting the composite interlayers of the two panels entirely around the perimeters thereof to form a closed chamber between said panels.

SAMUEL F. COX.